US005132870A

United States Patent [19]

Droho

[11] Patent Number: 5,132,870

[45] Date of Patent: Jul. 21, 1992

[54] IGNITOR CIRCUIT FOR DISCHARGE LAMPS WITH NOVEL BALLAST

[75] Inventor: Joseph S. Droho, Chicago, Ill.

[73] Assignee: North American Philips Corporation, New York, N.Y.

[21] Appl. No.: 693,974

[22] Filed: Apr. 29, 1991

Related U.S. Application Data

[62] Division of Ser. No. 637,248, Jan. 3, 1991, Pat. No. 5,051,840, which is a division of Ser. No. 503,393, May 7, 1990, Pat. No. 5,017,840, which is a division of Ser. No. 133,705, Dec. 16, 1987, Pat. No. 4,939,430.

[51] Int. Cl.[5] .......... H05B 41/16; H02B 1/18

[52] U.S. Cl. .......... 361/377; 174/DIG. 2; 315/291

[58] Field of Search .......... 174/52.1, 52.2, DIG. 2; 336/65, 90; 315/248, 278, 291; 361/331, 334, 356, 377, 380, 395, 417, 419, 420

[56] References Cited

U.S. PATENT DOCUMENTS

| | | | |
|---|---|---|---|
| 3,173,059 | 3/1965 | Stake | 361/377 |
| 4,805,175 | 2/1989 | Knowles | 372/24 |
| 4,939,430 | 7/1990 | Droho | 315/291 |
| 5,017,840 | 5/1991 | Droho | 315/291 |
| 5,030,889 | 7/1991 | El-hamamsy et al. | 315/200 R |
| 5,051,664 | 9/1991 | Droho | 315/278 |

*Primary Examiner*—Gerald P. Tolin
*Attorney, Agent, or Firm*—Robert T. Mayer

[57] ABSTRACT

A starting and operating circuit for a discharge lamp in which the ballast reactance includes first, second and third coil segments with the third coil segment comprising part of the ignitor circuit and being electrically connected between the first and second coil segments.

2 Claims, 3 Drawing Sheets

IGNITOR CIRCUIT FOR DISCHARGE LAMPS WITH NOVEL BALLAST

This is a division of application Ser. No. 637,248, filed Jan. 3, 1991, now U.S. Pat. No. 5,051,664; which is a division of application Ser. No. 503,393, filed May 7, 1990, now U.S. Pat. No. 5,017,840; which is a division of application Ser. No. 133,705, filed Dec. 16, 1987, now U.S. Pat. No. 4,939,430.

This is an invention in the lighting art. More particularly it involves an improved ignitor circuit for discharge lamps. The improvement is obtained because a ballast reactance is provided which simplifies the ignitor circuit.

Ignitor circuits for high intensity discharge lamps are well-known to those skilled in the art from disclosures such as that contained in U.S. patent application Ser. No. 760,000 filed Jul. 29, 1985, now U.S. Pat. No. 4,695,771, issued Sep. 22, 1987, and assigned to the assignee of this application. In the ignitor circuits shown in that application an inductance is provided in series with the starting elements because the starting circuit is subjected to substantially the entire starting pulse. The inductance prevents the ignition pulse energy from being drained away from the lamp by the starting circuit.

It is an object of this invention to provide an improved ignitor circuit for high intensity discharge lamps.

One of the features of the invention is the elimination of the inductive element from the ignitor circuit for a high intensity discharge lamp.

An advantage of the invention is the reduction in the size of the component package for the ignitor circuit of a high intensity discharge lamp.

Another advantage is the reduction in size of the remaining components for the ignitor circuit.

All of the foregoing benefits are obtained because the coils for the ignitor circuit have in accordance with the invention been electrically placed at approximately the midpoint of the ballast coil.

In accordance with the invention there is provided a ballast reactance for the starting and operating circuit of a discharge lamp. The ballast reactance includes a coil with first, second and a third coil segment means. Each coil segment means has a number of windings with at least one of the first and second coil segment means having a substantial number of more windings than the third coil segment means. Each coil segment means has two ends. The third coil segment means is electrically connected between the first coil segment means and the second coil segment means and forms electrical connections therewith regardless of the physical location of the third coil segment means on the coil relative to the locations of the first and second coil segment means.

In accordance with another aspect of the invention there is provided a starting and operating circuit for a discharge lamp including a ballast reactance. The ballast reactance has a body including a coil with first, second and third coil segment means, each with a number of windings. At least one of the first and second coil segment means has a substantial number of more windings than the third coil segment means. Each coil segment means has two ends. The third coil segment means is electrically connected between the first coil segment means and the second coil segment means and forms electrical connections therewith regardless of the physical location of the third coil segment means on the coil relative to the locations of the first and second coil segment means. The starting and operating circuit also comprises a discharge lamp with two terminal means. One terminal means is connected to open end of the second coil segment means and the other terminal means is provided for connection to an AC power supply return. A voltage sensitive switching means with two ends is also included. One end of the switching means is connected to the electrical connection between the first and third coil segment means. Also provided is a capacitor with two ends, one end of which is connected to the electrical connection between the second and third coil segment means. The circuit also has a resistor with two ends, one end of which is connected to the other ends of the voltage sensitive switching means and the capacitor. The resistor has its other end for connection to the AC power supply return.

In accordance with still another aspect of the invention there is provided a starting and operating circuit for a discharge lamp including a ballast reactance. The ballast reactance has a body including a coil with first, second and third coil segment means, each with a number of windings. At least one of the first and second coil segment means has a substantial number of more windings than the third coil segment means. Each coil segment means has two ends. The third coil segment means is electrically connected between the first coil segment means and the second coil segment means and forms electrical connections therewith regardless of the physical location of the third coil segment means on the coil relative to the locations of the first and second coil segment means. The starting and operating circuit also comprises a discharge lamp with first and second terminal means. The first terminal means is connected to one end of the second coil segment means. A voltage sensitive switching means with two ends is also included. One end of the switching means is connected to the electrical connection between the first and third coil segment means. Also provided is a capacitor with two ends, one end of which is connected to the electrical connection between the second and third coil segment means. The circuit also has a resistor with two ends, one end of which is connected to the other ends of the voltage sensitive switching means and the capacitor. The resistor has its other end connected to the second terminal means of the discharge lamp.

In accordance with a further aspect of the invention there is provided a combination for use with a discharge lamp including a ballast reactance with a body. The combination also includes a voltage sensitive switching means, a capacitor, a resistor and packaging means integral with the body of the reactance. The packaging means packages the voltage sensitive switching means, the capacitor and the resistor with the body of the reactance as an integrated unit.

In accordance with a still further aspect of the invention there is provided an autotransformer with a primary winding and a secondary winding connected to the primary winding. The secondary winding includes first, second and third coil segments. Each coil segment has two end wire means. One end wire means of third coil segment is connected to one end wire means of the first coil segment. The other end wire means of the third coil segment is connected to one end wire means of the second coil segment. The other end wire means of the first and second coil segments are provided for connection to the primary winding and to a discharge lamp, respectively.

In accordance with a still further aspect of the invention there is provided a starting and operating circuit for a discharge lamp including an autotransformer having a primary winding and a secondary winding connected to the primary. The secondary winding includes a coil with first, second and third coil segment means, each with a number of windings. At least one of the first and second coil segment means has a substantial number of more windings than the third coil segment means. Each coil segment means has two ends. The third coil segment means is electrically connected between the first coil segment means and the second coil segment means and forms electrical connections therewith regardless of the physical location of the third coil segment means on the coil relative to the locations of the first and second coil segment means. The circuit also comprises a discharge lamp with two terminal means. One terminal means is connected to the other end wire means of the second coil segment and the other terminal means is for connection to an AC power supply return. A voltage sensitive switching means is provided with two ends. One end is connected to one end wire means of the third coil segment. A capacitor with two ends is also included. One end of the capacitor is connected to the other end wire means of the third coil segment. Also included is a resistor with two ends, one end of which is connected to the other ends of the voltage sensitive switching means and the capacitor. The resistor has its other end for connection to the AC power supply return.

Other objects, features and advantages of the invention will become apparent to those skilled in the art from the following description and appended claims when taken in conjunction with the accompanying drawing in which:

Figure 1:
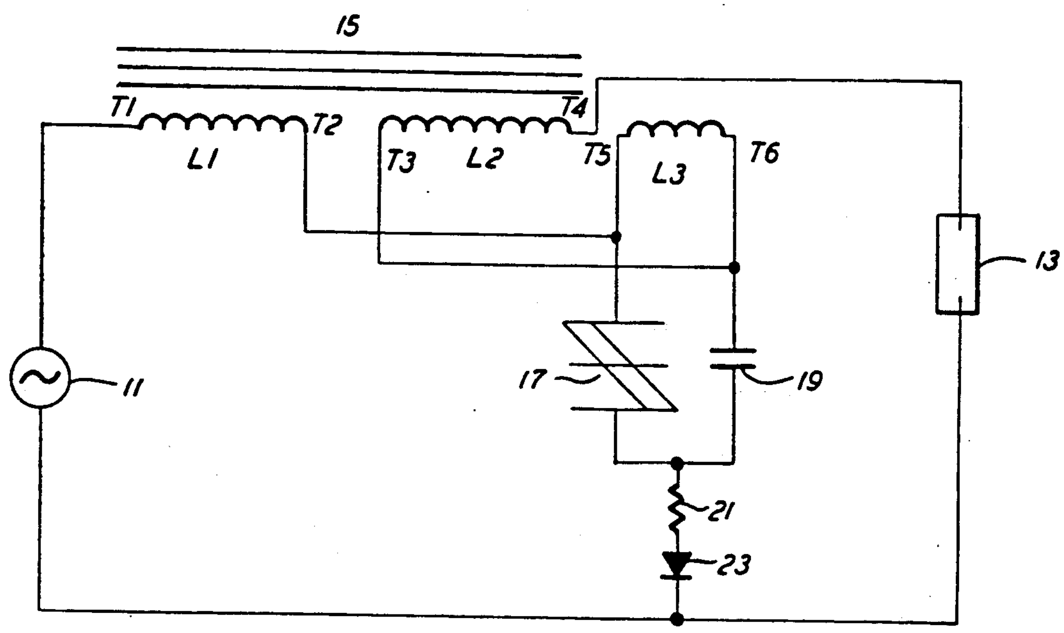
FIG. 1 is a representation of a starting and operating circuit for a discharge lamp.
Figure 3A:
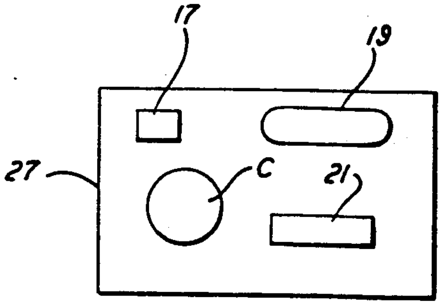
Figure 3B:
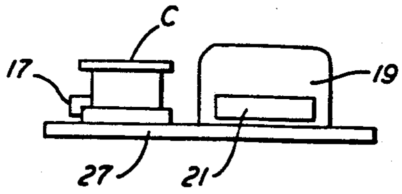
Figure 4:
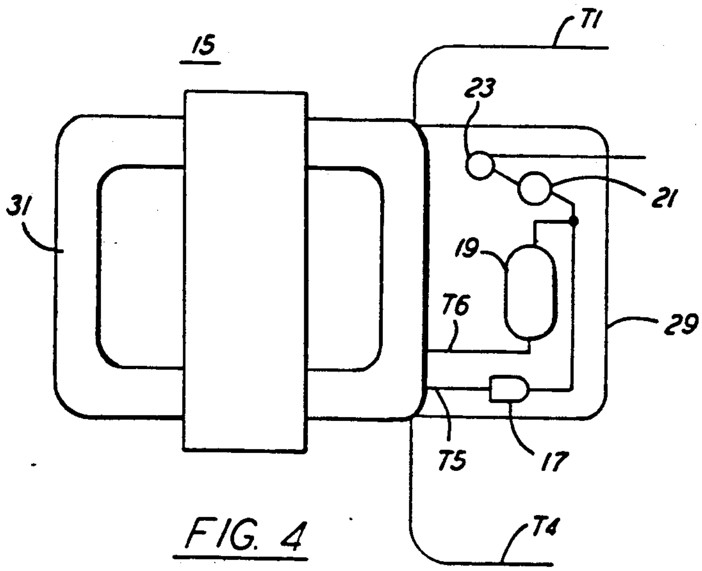
Figure 5:
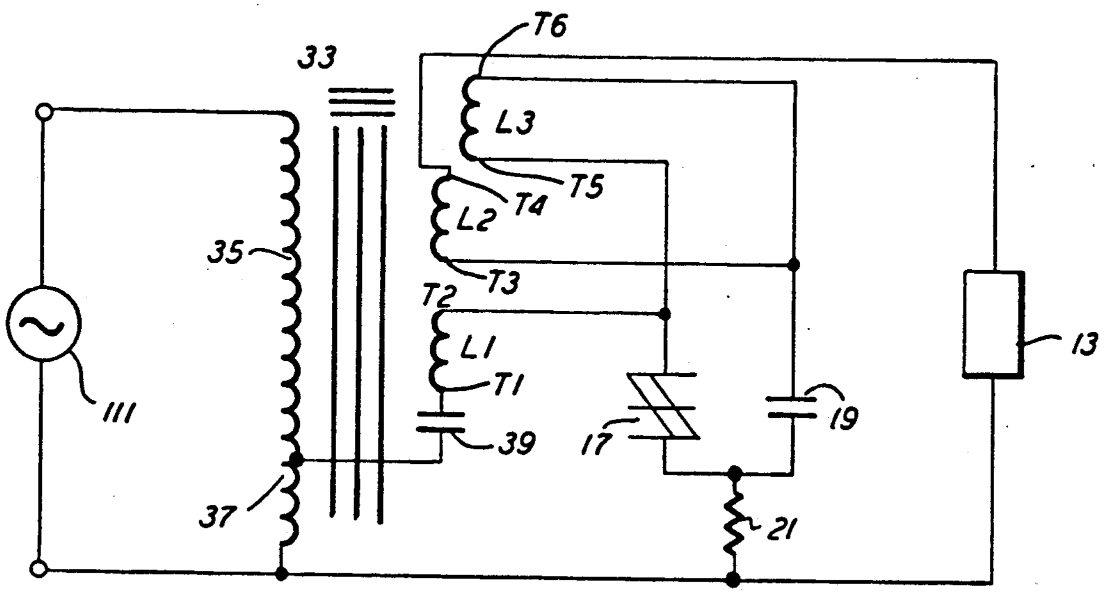
Figure 6:
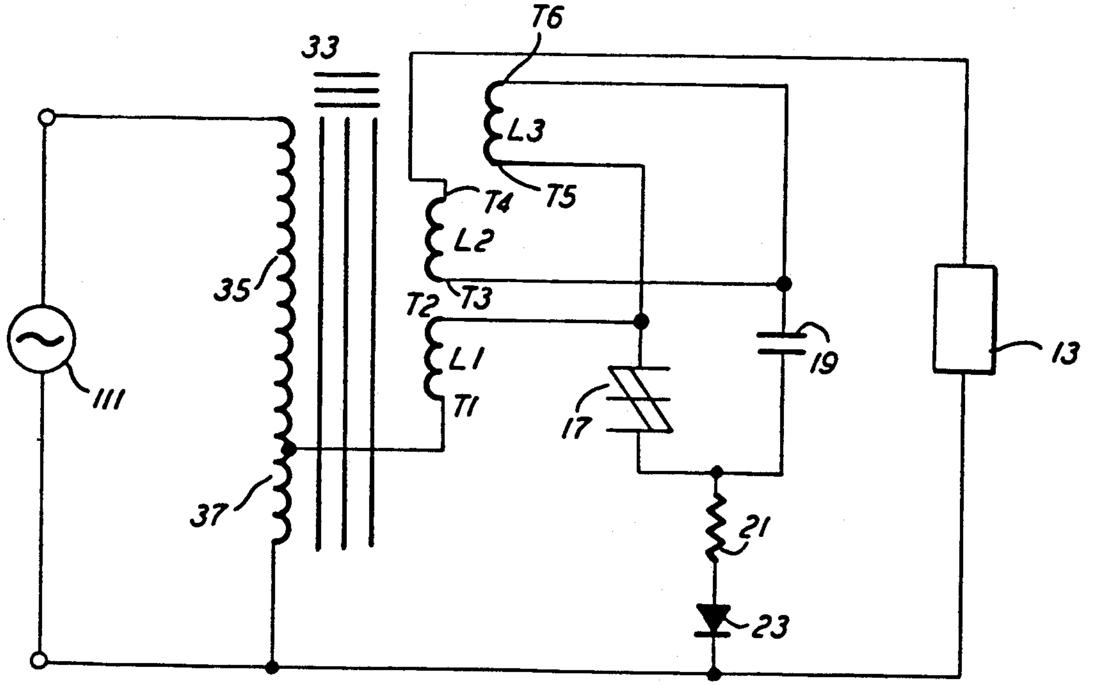
Figure 7:
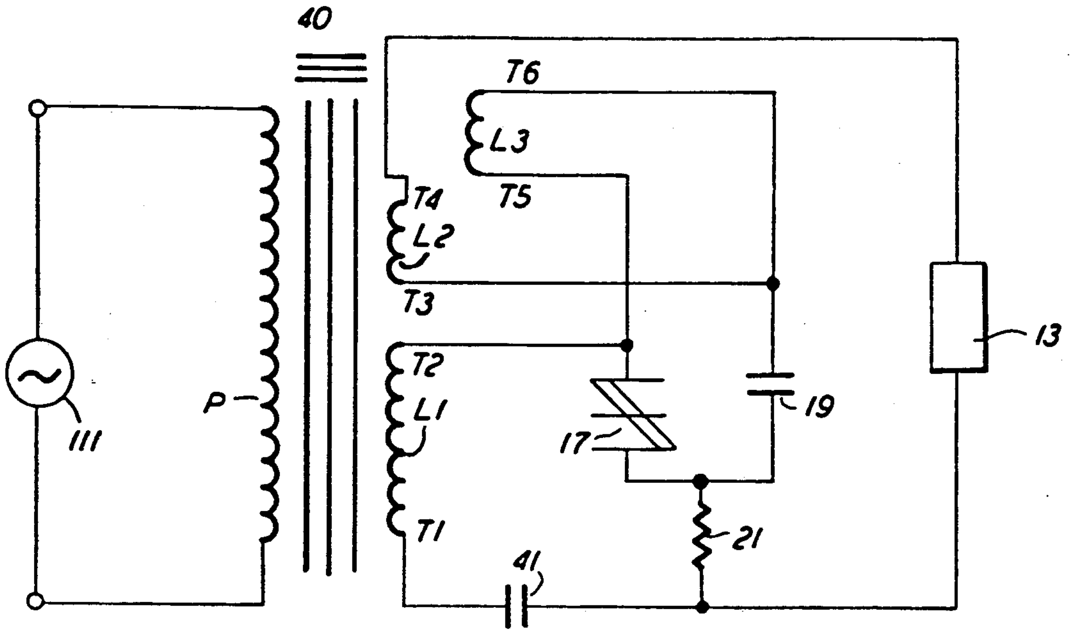
Figure 8:
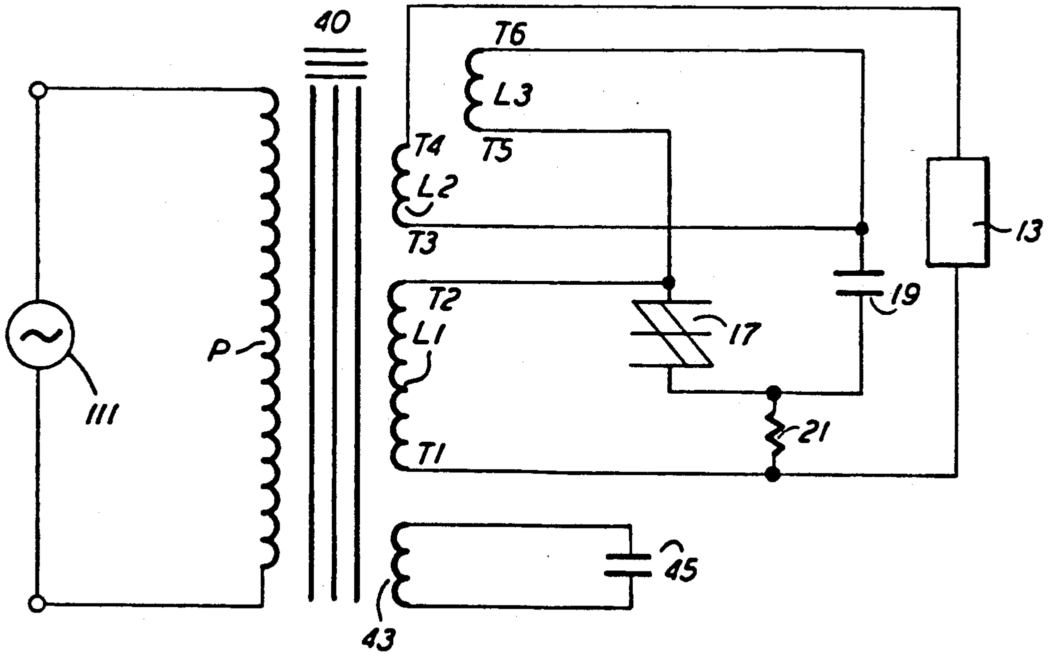

FIGS. 3*a* and 3*b* are representations of a component package used in prior art starting and operating circuits for discharge lamps;

FIG. 4 is a representation of a ballast reactance and the components of an ignitor circuit such as used in the circuit of FIG. 1;

FIG. 5 is a representation of a leading starting and operating circuit for a discharge lamp using an autotransformer;

FIG. 6 is a representation of a lagging starting and operating circuit for a discharge lamp using an autotransformer;

FIG. 7 is a representation of a starting and operating circuit for a discharge lamp using the secondary of an isolation transformer; and FIG. 8 is a representation of a starting and operating circuit for a discharge lamp using the secondary of a regulated isolation transformer.

In the various figures of the drawing the same component or similar ones are identified by the same reference characters.

Referring to FIG. 1 there is shown a source 11 of AC power connected across a starting and operating circuit for discharge lamp 13. The starting and operating circuit includes a ballast means 15 having a coil with three coil segments L1, L2 and L3. Each of the coil segments has two end wires, T1 and T2 for coil segment L1, T3 and T4 for coil segment L2 and T5 and T6 for coil segment L3. End wire T5 of third coil segment L3 is connected to end wire T2 of coil segment L1. End wire T6 of coil segment L3 is connected to end wire T3 of coil segment L2. In this way coil segment L3 is electrically connected between coil segments L1 and L2 and forms electrical connections therewith.

End wire T1 of coil segment L1 is connected to one side of AC source 11. End wire T4 of coil segment L2 is connected to one terminal of lamp 13. The other terminal of lamp 13 is connected to the other or return side of AC source 11. End wire T5 of coil segment L3 is connected to one terminal of a voltage sensitive switching means 17 shown in this embodiment as a sidac, although as those skilled in the art will understand other voltage sensitive switching elements could also be employed. End wire means T6 of coil segment L3 is connected to one terminal of capacitor 19. The other terminals of sidac 17 and capacitor 19 are connected to one terminal of resistor 21. The other terminal of this resistor is connected to one terminal of diode 23, the other terminal of which is connected to the second or return side of AC source 11.

Figure 2:
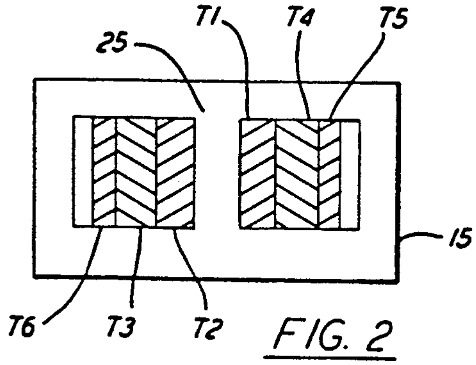
FIG. 2 is a cross-sectional representation of a ballast reactance for use in the circuit of FIG. 1.

Each of coil segments L1, L2 and L3 have a number of windings. Coils L1 and L2 have a substantial number of more windings than L3. While coil segment L3 which forms the ignitor coil is electrically connected between segments L1 and L2 as shown in FIG. 2 it may be physically located anywhere on the coil as long as it is made accessible for electrical connection as shown in FIG. 1. In one constructed embodiment the turns or windings of coil segment L3 as shown in FIG. 2 encircle the turns or windings of coil segment L2 which in turn encircle the turns or windings of coil segment L1. The turns of coil segment L1 encircle core 25 of reactance ballast 15. As those skilled in the art will understand since the number of turns in coil segment L3 are very low in number in practice they may not encircle the turns of coil segment L2 but rather lie in the same layer as the outer turns of coil segment L2.

In one application of the invention coil segments L1 and L2 were about equal in their number of turns. It is to be understood that the electrical location of coil segment L3 between the turns of coil segments L1 and L2 is selected so that after lamp 13 is turned on the ignitor circuit no longer operates. It is also to be understood that notwithstanding the electrical location of coil segment L3, the ignitor circuit is responsive to the open circuit voltage across the lamp 13 as in prior starting and operating circuits.

The novel electrical connection of the turns of coil segment L3 between coil segment L1 and coil segment L2 permitted a reduction in the size of capacitance 19. In one application where a 120 volt supply was lighting a 52 volt lamp, capacitor 29 was reduced from a 0.47 microfarad capacitor to a 0.33 microfarad one. The decrease in capacitance also permitted an increase in the resistance of resistor 21. In this case resistor 21 went from 4.7 kiloohms to 5.6 kiloohms. The losses of the circuit were also decreased. In addition resistor 21 could be selected with a lower wattage rating than in previous cases. Its ratings was reduced from 4 watts to 2 watts.

With the elimination of the inductance from the ignitor circuit a new packaging of the ignitor components was designed. The old packaging is partially shown in FIGS. 3*a* and 3*b* about to scale. As can be seen, sidac 17, capacitor 19, resistor 21 and coil C were mounted on a small printed circuit board 27. In packaging these for sale to lamp users, this printed circuit board was protected by a metal or plastic can in which the printed circuit board was secured in a suitable manner such as by being potted.

In the new packaging design, with the elimination of coil C, some outside turns 29 of the ballast reactance wrapping are wrapped around side 17, capacitor 19, resistor 21 and diode 23 to hold them against coil 31 as shown in FIG. 4. The outside turns 29 of the wrapping serve as a packaging means which is integral with the body of the ballast reactance for packaging the voltage sensitive switching means, the capacitor, the resistor and the diode with the body of the reactance as an integrated unit. This results in a much smaller total package than in previous versions of a ballast reactance and its separately canned ignitor circuit.

Shown in FIG. 5 is an alternative version of a starting and operating circuit for a high intensity discharge lamp. In this embodiment a power source 111 feeds the primary winding of an autotransformer 33 whose primary winding is split into two sections 35 and 37. A tap is located between sections 35 and 37. The secondary of the autotransformer which is arranged in the same way as ballast reactance 15 of FIG. 1 is connected to the tap. An advantage of this embodiment is that capacitance 39 in the secondary winding provides a desirable leading power factor for the starting and operating circuit for lamp 13. Without the capacitance, as in FIG. 6, a lagging power factor is obtained. In the alternative embodiment of FIG. 6, diode 23 is also shown in FIG. 1 but it is to be understood that such a diode is only a desirable addition to both starting and operating circuits of FIGS. 1 and 6. Also, its orientation is not important. As those skilled in the art will understand, the presence of such a diode permits reduction in component value and/or size over components in a circuit without such a diode.

FIG. 7 shows that the invention may also be used where the ignition coil is part of the secondary of isolation transformer 40. Primary P of this transformer is connected across power source 111. The secondary is connected to similar to that of the previously described ballast reactances of the invention. A leading circuit is shown using capacitor 41. As those skilled in the art will understand the removal of capacitor 41 will provide a lagging circuit. A diode such as diode 23 in FIG. 6 could also be used in this lagging circuit, if desired.

FIG. 8 shows that the invention may also be used with a regulated isolation transformer where the regulation is provided by tertiary winding 43 and capacitor 45. As those skilled in the art understand, the ballasting provided by the circuit of FIG. 8 is provided by the leakage inductance between the tertiary and secondary windings.

Various modifications of the above-described embodiments will be evident to those skilled in the art and for that reason the arrangements described herein are for illustrative purposes only and are not to be considered restrictive.

What is claimed is:

1. A combination for use with a discharge lamp including a ballast reactance with a wrapping, said reactance having a body and said combination also comprising a voltage sensitive switching means, a capacitor, a resistor and packaging means integral with the body of said reactance, said packaging means packaging said voltage sensitive switching means, said capacitor and said resistor with said body as an integrated unit, said packaging means including at least one outer turn of said ballast reactance wrapping.

2. A combination as claimed in claim 1, including a diode, said packaging means also packaging said diode with said body.

* * * * *